United States Patent [19]
Addeo et al.

[11] Patent Number: 5,480,942
[45] Date of Patent: Jan. 2, 1996

[54] PROPYLENE POLYMERS GRAFTED WITH POLYALKENYLENES AND PROCESS FOR THEIR PREPARATION

[75] Inventors: Antonio Addeo, Novara; Corrado Brichta, Milan; Francesco Mascia, Guanzate; Arturo Marchioni, Cuveglio, all of Italy

[73] Assignee: Spherilene S.r.l., Italy

[21] Appl. No.: 239,712

[22] Filed: May 9, 1994

[30] Foreign Application Priority Data

May 13, 1993 [IT] Italy ................... MI93A0975

[51] Int. Cl.⁶ ................... C08F 255/02
[52] U.S. Cl. ................... 525/194; 525/232; 525/320; 525/322
[58] Field of Search ................... 525/194, 232, 525/320, 322

[56] References Cited

U.S. PATENT DOCUMENTS

| | | | |
|---|---|---|---|
| 4,008,190 | 2/1977 | Taylor et al. | 525/194 |
| 4,284,535 | 8/1981 | Lal et al. | 525/232 |
| 4,556,695 | 12/1985 | Ijntema . | |
| 4,948,820 | 8/1990 | Addeo . | |

FOREIGN PATENT DOCUMENTS

| | | | |
|---|---|---|---|
| 689685 | 6/1964 | Canada | 525/320 |
| 261786 | 3/1988 | European Pat. Off. . | |
| 2-191643 | 12/1990 | Japan | 525/194 |
| 3-290416 | 12/1991 | Japan | 525/322 |

OTHER PUBLICATIONS

*Plastics, Rubber and Composites Procesing and Applications,* F. H. Axtell, et al. "Impact modification of polypropylene with trans–polyoctenamer elastomer" vol. 18 pp. 47–58 (1992).
*Journal of Materials Science,* W. Wenig "Crystallization behaviour of isotactic polypropylene blended with transoctenylene rubber" vol. 27 pp. 1171–1174 (1992).
Derwent Abstract and Family Search of JP 54090291 (1979).

*Primary Examiner*—Romulo H. Delmendo
*Attorney, Agent, or Firm*—Bryan Cave

[57] ABSTRACT

Polymers and copolymers of propylene are modified by grafting with polyalkenylenes having a trans double bond content of higher than 30%. The preparation is carried out via thermic treatment of the propylene (co)polymer with said polyalkenylene at a temperature comprised between 200° and 350° C. an the presence of a free radical initiator other than peroxide.

7 Claims, No Drawings

PROPYLENE POLYMERS GRAFTED WITH POLYALKENYLENES AND PROCESS FOR THEIR PREPARATION

The present invention regards propylene homo- and co-polymers grafted with polyalkenylenes and process for preparing them by reactive transformation of the homo- or co-polymer of polypropylene in the presence of polyalkenylene and particular non-peroxide radical initiators.

Modifying crystalline propylene homo- and co-polymers by degradation at high temperatures with non-peroxide radical initiators is known, obtaining a marked improvement in the fluidity in the molten state and therefore processability.

Japanese patent 58-090291 describes the use of alkyl and bromo derivatives of 1,2-diphenylethane as radical initiator in the controlled degradation process of propylene polymers. The polymers obtained show good rheological properties; yet at the same time the mechanical properties, in particular the impact strength, are worsened.

The same problems are found with the products obtained according to the process described in U.S. Pat. No. 4,556,695, in which the controlled degradation is carried out using chlorinated derivatives of 1,2-diphenylethane.

In the U.S. Pat. No. 4,948,820, the selective degradation of crystalline propylene polymers and copolymers at a temperature comprised between 250° and 300° C. through the use of particular benzopinacol derivatives is described; also in this case the degraded polymers are obtained with controlled rheology, but in none of the cases was the impact strength of the material improved.

Modifying crystalline propylene polymers by treating at temperatures comprised between 250° and 300° C. with α-olefin polymers and copolymers, for example 1-butene, in the presence of a peroxide radical initiator, is also known from European patent 261,786. Even operating in this way the modified product obtained does not show improved impact strength properties and in addition the presence of the peroxide initiator can bring about secondary crosslinking reactions of the polymer.

Modifying the propylene polymer properties by blending with elastomers is known. In particular, blends of isotactic polypropylene with poly-(trans-octenamer) rubber (TOR) are known (Journal of Material Science, 27, pag. 1171-1174, 1992). However the mechanical properties of these blends, in particular the impact strength, are not improved in any way.

The modification of polypropylene by using poly-(transoctenamer) rubber crosslinked with a radical crosslinking agent consisting of m-phenylene-bis-maleimide has also been described (Plastic, Rubber and Composite Processing and Applications, 18, pag. 47-58, 1992). The blends so obtained show improvements in impact strength; the product is however characterized by inferior fluidity properties in the molten state and in addition presents a rheological behaviour not particulary suitable to injection moulding. In addition the manufactured articles obtained from these blends are opaque and show a sensitive reduction in the elastic modulus and are therefore not suitable for interesting applicative fields, such as for example the packaging sector.

Now new propylene polymers having long chain branching have been surprisingly found, endowed with valuable mechanical and rheological properties. These polymers are in fact characterized by a high fluidity in the molten state and at the same time a marked impact strength.

The polymers of the invention can be prepared by a new process of reactive transformation of the propylene homopolymer and copolymer in such a way that the fluidity is increased without incurring reduction of the impact strength properties which is verified in the conventional process of degradation for obtaining polymers with controlled rheology.

The process of the invention comprises a thermal treatment, at a temperature comprised between 200°-350° C., of a propylene polymer with reactive polyalkenylenes in the presence of non-peroxide radical initiators.

Both homopolymers and copolymers of propylene are encompassed by the term propylene polymer. In particular they comprise: (co)polymers with a isotactic index of higher than 80%; crystalline copolymers with small amounts of one or more α-olefins having 2–10 carbon atoms, for example ethylene, 1-butene, 1-pentene, 4-methyl-1-pentene, 1-hexene, 1-octene; impact strength polypropylene compositions obtained through sequential polymerisation of propylene and its mixture with ethylene and/or α-olefins; syndiotactic propylene polymers; blends of isotactic polypropylene with EP(D)M rubbers.

The propylene polymers have Melt Flow Index (MFI) values generally comprised in the range from 0.1 to 100, preferably between 0.2 and 50 at 230° C./21.6 N (according to ASTM 1238 L).

The reactive polyalkenylene have a trans double bond content generally higher than 30% (calculated with respect to the total number of double bonds present in the polyalkenylene chain) and preferably comprised between 35 and 80%.

Preferably the polyalkenylene used is a polyoctenylene having a content of trans double bonds higher than 60%. These compounds can be prepared by metathesis reaction starting from cyclooctene. Examples of these compounds are trans Octenamer Rubber (TOR), commercialised by Chemische Werke Huels AG with the name vestenamer 8012 and Vestenamer 6213. Other examples of suitable polyalkenylenes for use in the process of the invention are trans-polyhexanamers obtained by copolymerization of butadiene and ethylene with a vanadium catalyst.

The quantity of polyalkenylene used in the process of the invention can vary within a broad range; generally the quantity is less than 20% by weight and preferably comprised between 0.1 and 10% by weight.

The non-peroxide free radical initiators used in the process of the invention may be selected from, for example, alkyl derivatives of 1,2-diphenylethane and silylbenzopinacole derivatives. Good results are obtained with the use of 2,3-dimethyl- 2,3-diphenylbutane (commercialised as Interox CCDFB by Peroxyd Chemie) as well as 3,4-dimethyl-3,4-diphenyl hexane (commercialised as Interox CCDHF by Peroxyd Chemie) and oligomers of 1,3- and 1,4-diisopropyl benzene.

The amount of non-peroxide radical initiator to be used in the process of the invention may vary within a wide range according to the desired effect and, in general, is comprised between 0.05 and 3% by weight of the polymer, preferably between 0.1 and 1% by weight.

In order to prevent oxidative thermodegradation phenomena of the copolymer, the process of the invention is carried out in the presence of antioxidants and stabilisers.

Any primary and secondary antioxidising agent conventionally used, can be used as antioxidising agent. In particular sterically hindered phenols can be mentioned, preferably 2,6-di-t-butyl-4-methylphenol (BHT), secondary aromatic amines, thioethers, phosphites, phosphonites, zinc dithiobutylcarbamate and their mixtures. In addition also a synergic combination of BHT with 2,2'-thiodiethyl-bis-[3-(3,5-di-t-butyl- 4-hydroxyphenyl) propionate] and/or with phosphite and phosphonite can be advantageously used.

The antioxidants are generally used in amounts not higher than 2% by weight, preferably between 0.01 and 1% by weight.

Other additives such as UV stabilisers, nucleating agents, lubricants, flame-retardants, etc, can also be added to this compound.

In order to impart appropriate mechanical properties it is additionally possible to use other additives such as for example talc, mica, calcium carbonate and reinforcing agents such as for example glass fibre.

The restructuring process through grafting with polyalkenylene occurs at a temperature comprised in the range of 200°–350° C., preferably in the range of 270°–330° C.

The restructuring process may be carried out by heating to a suitable temperature for a period of time generally comprised between 0.1 and 20 minutes, preferably between 0.5 and 10 minutes, operating in a conventional ram mixer, for example of the Banbury type, or preferably in an extruder.

The polyalkenylene can be added in powder form or as granules together with the radical initiator and the propylene polymer, or under the form of concentrated masterbatch of polymer directly introduced into the extruder together with the (co)polymer to be restructured.

The composition to be restructured can preferably be subjected to a preliminary hot mixing at a temperature comprised between 220° and 240° C. and subsequent treatment at the reaction temperature indicated.

This reaction may be advantageously carried out during the transformation process of the (co)polymer via injection moulding.

As an alternative the propylene polymers may be subjected to a preliminary degradation reaction in the presence of the previously mentioned radical generators at a temperature of 270°–330° C. The polyalkenylene is then added to the so obtained product which is then subjected to restructuring reaction at a temperature comprised between 200° and 250° C.

According to a further method the radical generators as well as the antioxidants can be added beforehand during the synthesis of the propylene polymer. The polyalkenylene is then added to the so obtained (co)polymers and which is then subjected to the restructuring reaction.

The process of restructuring leads to an increase in Melt Flow Index of the polymer and at the same time a marked increase in the impact strength of the articles so obtained.

With the process of the invention it is possible to obtain transparent articles with thin walls having a high impact strength by injection moulding, starting from polymers with low MFI (MFI 230° /21.6 N about 0.3) unusable with the current techniques. The moulding cycles result quicker than those in conventional processes and therefore allow a greater productivity and energy saving.

The following examples are supplied with the aim of illustrating and not limiting the invention.

EXAMPLES

EXAMPLE 1 (comparison)

1000 parts by weight of crystalline polypropylene in powder form, having a Melt Flow Index at 230° C./21.6 N equal to 0.3 dg/min (measured according to ASTM 1238/L), produced and commercialised by Himont Italia ( commercial name Moplen Spheripol YD50G), were subjected to mixing for a period of 0.5 minutes in a Henschel turbomixer with 1.0 part by weight of BHT, 1.0 part by weight of phenolic antioxidant (Irganox 1035 produced and commercialised by Ciba-Geigy) and 1.0 part by weight of calcium stearate. Lastly 6 parts by weight of non-peroxide radical initiator, Interox CCDFB, were added.

The mixture was fed in the hopper of a single screw extruder of the Dolci type with a diameter of 45 mm and then extruded operating at a temperature of the extruder head of 285°–290° C., with a load of about 10 Kg/hour, a screw speed of $50/60$ revolutions per minute and a residence time of about 200 seconds. Lastly the mixture went to granulation and from the granules standard bars having a thickness of 3 mm were obtained by injection moulding in a injection moulding press Negri and Bossi 225–640 N (with a barrel having a diameter of 50 mm and a free die), operating at a melt temperature of 230°– 240° C. and a specific pressure of 980 bar. The die was thermostated at a temperature of 30° C.

Some of the specimens so obtained were ground and subjected to MFI measurements; others were subjected to Charpy impact strength tests with notching according to ASTM D256, at 23° C. and the flexural modulus test according to ASTM D790.

The total energy at break was determined according to the ball drop method. For this reason disks having a diameter of 100 mm and a thickness of 3 mm were injection moulded. The test has been carried out operating with a beam having a hemispherical head of diameter equal to 20 mm, with a clear span diameter of the support of 60 mm and an impact speed of 5 m/sec, with instruments according to DIN 53443, $2^{nd}$ part.

The MFI values and mechanical properties determined are reported in Table 1. It is evident that the remarkable increase in MFI subsequent to the degradation brings about a notable decrease in impact strength.

EXAMPLE 2

Proceeding as for example 1 with the exception that the initial mixture comprises 10 parts by weight of poly trans Octenamer Rubber having an average molecular weight of $1.0 \times 10^{+5}$, a cis/trans double bond ratio equal to 80:20, commercialised by Huels AG with the name of Vestenamer 8012.

From table 2 it is clear that the MFI values of the restructured polymer have increased by about 40 times with respect to the starting polymer and at the same time the impact strength properties remain high. The specimens obtained are not opalescent but are completely transparent.

EXAMPLE 3 (comparative)

The mechanical properties were determined on a commercial sample of polypropylene (Moplen T 30 G commercialised by Himont Italia) having MFI=4. The specimens necessary for the test were prepared by injection moulding as described in example 1. The results are reported in Table 1.

EXAMPLE 4

5 Kg of polypropylene Moplen YD 50 G was mixed in a Henschel turbomixer with 0.1% by weight of BHT and 0.1% by weight of Irganox 1035. Then non-peroxide radical initiator Irganox CCDFB (0.6% by weight), calcium stearate (0.1% by weight) and 0.5% by weight of Vestenamer 8012 were added.

The composition was then subjected to mixing in a Werner Pfleider mixer with co-rotating screws at a temperature of 220°–240° C. and then granulated. The product obtained was then subjected to injection moulding at a temperature of 280°–290° C. The specimens obtained were characterized according to what was described in example 1 and the results were reported in Table 1. Comparing the data obtained with those of example 3, it can be seen that for the same MFI the impact strength properties are markedly improved. In addition the resulting specimens obtained are completely transparent whilst the specimens from example 3 showopalescent.

EXAMPLE 5

To 95 parts by weight of Moplen YD 50 G, 5 parts by weight of a masterbatch consisting of Moplen YD 50 G (87.97% weight), Interox CCDFB (12% weight), BHT (0.1% weight), Irganox 1035 (0.1% weight) calcium stearate (0.1% weight) were added. The mixture was then extruded at 280°–290° C. and granulated. To 100 parts by weight of this product, having an MFI equal to 20, a subsequent addition of 5 parts by weight of Vestenamer 8012 were added. After mixing in a tumbler, the injection moulding was carried out at a temperature of 230°–240° C. The MFI values and the mechanical properties are reported in Table 1.

EXAMPLE 6

100 parts by weight of the ethylene/propylene copolymer (containing 5% by weight of ethylene) commercialised by Himont Italia as Moplen EPD 60 R, having a MFI equal to 0.35 dg/min, were mixed in a Tumbler with 0.1% by weight of BHT antioxidant, 0.1% by weight of Irganox 1035, 0.1% by weight of calcium stearate. 0.6% by weight of Interox CCDHF was then added. 5 parts by weight of poly trans Octenamer Rubber, having an average molecular weight of $1.210^{-5}$ and a trans/cis double bond ratio of 60:40 and commercialised by Huels AG as Vestenamer 6213, was then added to the composition. The composition so obtained was subjected to extrusion at 290° C. Subsequently the copolymer was compression moulded at 240° C. and the specimens so obtained were used for the determination of the mechanical tests as described in example 1. The results obtained were reported in table 1.

TABLE 1

| Ex. | MFI (ASTM D1238/L) (dg/min) | IMPACT STRENGTH Charpy (ASTM D256) (KJ/m$^2$) | IMPACT STRENGTH ball drop (DIN 53443) (J/mm) | BENDING ELASTICITY MODULUS (ASTM D790) (N/mm$^2$) |
|---|---|---|---|---|
| 1 | 25.0 | 2.8 | 0.3 | 1897 |
| 2 | 11.5 | 6.1 | 10.7 | 1507 |
| 3 | 4.0 | 5.6 | 1.6 | 1500 |
| 4 | 4.5 | 13.8 | 17.7 | 1550 |
| 5 | 5.6 | 7.9 | 20.0 | 1600 |
| 6 | 11.0 | 29.8 | 24.4 | 1100 |

We claim:

1. A graft-modified propylene polymer comprising a polyalkenylene grafted onto a propylene polymer.

2. A polymer according to claim 1, wherein the polyalkenylene has a trans double bond content of higher than 30%.

3. A polymer according to claim 2, wherein the trans double bond content is from 35 to 80%.

4. A polymer according to claim 1 wherein the amount of polyalkenylene is less than 20%.

5. A polymer according to claim 4, wherein the amount of polyalkenylene is from 0.1 to 10%.

6. A polymer according to claim 1, wherein the polyalkenylene is poly-(trans-Octenamer) having a trans double bond content of higher than 60%.

7. A polymer according to claim 1 wherein the polyalkenylene is poly trans hexenamer having a trans double bond content of higher than 60%.

* * * * *